(12) United States Patent
Tillotson

(10) Patent No.: US 11,111,013 B2
(45) Date of Patent: Sep. 7, 2021

(54) UPDRAFT ASSISTED ROTORCRAFT TAKE-OFF

(71) Applicant: THE BOEING COMPANY, Chicago, IL (US)

(72) Inventor: Brian Tillotson, Kent, WA (US)

(73) Assignee: THE BOEING COMPANY, Chicago, IL (US)

(*) Notice: Subject to any disclaimer, the term of this patent is extended or adjusted under 35 U.S.C. 154(b) by 378 days.

(21) Appl. No.: 16/192,095

(22) Filed: Nov. 15, 2018

(65) Prior Publication Data
US 2020/0156776 A1    May 21, 2020

(51) Int. Cl.
*B64C 27/467*    (2006.01)
*B64C 27/06*    (2006.01)

(52) U.S. Cl.
CPC ............ *B64C 27/467* (2013.01); *B64C 27/06* (2013.01)

(58) Field of Classification Search
CPC .................................................... B64C 27/467
See application file for complete search history.

(56) References Cited

U.S. PATENT DOCUMENTS

| | | | |
|---|---|---|---|
| 5,269,657 A | 12/1993 | Garfinkle | |
| 5,383,767 A | 1/1995 | Aubry | |
| 5,544,844 A | 8/1996 | Groen et al. | |
| 5,681,013 A | 10/1997 | Rudolph | |
| 6,077,041 A | 6/2000 | Carter, Jr. | |
| 6,318,677 B1 | 11/2001 | Dixon | |
| 6,471,158 B1 | 10/2002 | Davis | |
| 2008/0317600 A1 | 12/2008 | Enevoldsen et al. | |
| 2009/0020652 A1 | 1/2009 | Rincker et al. | |
| 2016/0207617 A1 | 7/2016 | Sada-Salinas | |
| 2019/0077501 A1 | 3/2019 | Kawiecki | |

FOREIGN PATENT DOCUMENTS

| | | |
|---|---|---|
| CN | 1483634 A | 3/2004 |
| DE | 10151954 A1 | 4/2003 |
| EP | 0459937 A1 | 12/1991 |
| EP | 2186728 A1 | 5/2010 |
| GB | 529243 | 11/1940 |
| RU | 2027642 C1 | 1/1995 |
| RU | 2181332 C2 | 4/2002 |
| WO | 198204426 A1 | 12/1982 |
| WO | 200061918 | 10/2000 |

OTHER PUBLICATIONS

"A car that flies, a plane that drives", PAL-V, 2016, 9 pages.
(Continued)

*Primary Examiner* — Jessica B Wong
(74) *Attorney, Agent, or Firm* — Moore IP Law

(57) ABSTRACT

A rotorcraft includes a frame and an engine coupled to the frame. The rotorcraft also includes a rotor hub coupled to the engine and a plurality of rotor blades coupled to the rotor hub. Each rotor blade is configured to be adjusted to a negative pitch angle such that each rotor blade is oriented at a negative angle of attack. The rotation of the plurality of rotor blades at the negative pitch angle generates an updraft that, during a vertical take-off operation, applies an upward force to the rotorcraft to supplement lift generated by the plurality of rotor blades.

20 Claims, 5 Drawing Sheets

(56) References Cited

OTHER PUBLICATIONS

"Lifting personal transportation into the third dimension", mycopter, 2016, 1 page.
"Afzal Suleman", University of Victoria, Mechanical Engineering, 2015, 2 pages.
"Autogyro/Gyrocopter", DLR Institute of Flight Systems, 2011, 5 pages.
"Best Flying Cars concepts: Terrafugia Transition, Aeromobil, PAL-V—which one u prefer?", YouTube, 2016, 4 pages.
"CarterGyro Demonstrator Jump Takeoff Gyrocopter", YouTube, Published Apr. 5, 2007. <https://www.youtube.com/watch?v=CFNc1iY8wi0>.
"Letting fly", the Engineer, Jan. 17, 2006, 5 pages.
"Maintenance Manual, Gyroplane Type Calidus (UK spec only)", RotorSport UK Ltd, Jan. 27, 2010, 90 pages.
"RC Autogyro Mega", Mega Motor, 2012, 1 page.
"Research and Markets: The Global Unmanned Aerial Vehicle Market 2015-2025—Market Size and Drivers of the $115 Billion Industry", BusinessWire, 2015, 3 pages.
"The Business of Luxurious Cars: Must-Read Reports & Analysis", ReportLinker, 2016, 3 pages.
"The Transition", Terrafugia, 2016, 4 pages.
"USB Pro Data Recorder", Eagle Tree Systems, 2013, 2 pages.
"Volocopter", 2016, 4 pages. <https://www.volocopter.com/de/>.
"What do you think? The roadable aircraft", Airwork, May 2, 2010, 5 pages.
Ali, Salim , "Pilotless Flying Cars versus Driverless Cars", All about Safety Engineering, Dec. 22, 2015, 5 pages.
Eddy, Nathan , "Google's Larry Page Investing Millions in Flying Cars", InformationWeek, Jun. 9, 2016, 9 pages.
Linn, Allison , "Flying car not as far-fetched a fantasy as you might think", Honolulu Advertiser, Aug. 29, 2004, 2 pages.
Majhi, Jyoti Ranjan, et al., "Modeling Helicopter Rotor Blade Flapping Motion Considering Nonlinear Aerodynamics", Tech Science Press, CMES, vol. 27, No. 1, 2008, 13 pages.
Thomson, D. G., et al., "Application of Parameter Estimation to Improved Autogyro Simulation Model Fidelity", Journal of Aircraft, vol. 42, No. 1, Jan.-Feb. 2005, 9 pgs.
Tielin, Ma , et al., "A Fast Method of Aerodynamic Computation for Compound Gyroplane", Aug. 15-16, 2015, 6 pages.
Warwick, Graham , "Airbus Reveals Urban Air-Transport Projects", Aviation Daily, Aug. 2, 2016, 4 pages.
Wheatley, John B, et al., "Analysis and Model Tests of AutoGiro Jump Take-Off", National Advisory Committee for Aeronautics, No. 582, Washington, Oct. 1936, 31 pages.
Johnson, Wayne, "Helicopter Theory", Princeton University Press, 1980, pp. 1-961.
Lentz, W. Karl, et al., "Optimum Coupling in Thin-Walled, Closed-Section Composite Beams", Journal of Aerospace Engineering, vol. 11, Jul. 1998, 10 pgs.
Shete, C. D., et al., "Optimal control of a pretwisted shearable smart composite rotating beam", Acta Mechanica, vol. 191, 2007, pp. 37-58.
Mega Motor <http://www.megamotor.cz/v4/script/default.php?&sid=3038784308810fc1465c3397b23c4429&page_id=lang_eng> retrieved Sep. 12, 2017, 1 pg.
Oh, S.-Y. et al., "Thin-walled Rotating Composite Blades Featuring Extension-Twist Elastic Coupling," AIAA Paper 2004-2049, 45th AIAA/ASME/ASCE/AHS/ASC Structures, Structural Dynamics & Materials Conference, Apr. 19-22, 2004, Palm Springs, CA., 13 pgs.
Nangia, R. K. et al., 2007, "Leading-Edge Vortex Flaps on Moderate Sweep Wings—UCAV, Flow improvement at High Lift," AIAA Paper 2007-267, 45th AIAA Aerospace Sciences Meeting and Exhibit, Jan. 8-11, 2007, Reno, Nevada, 17 pgs.
Swanton, E. W. M. et al., "Leading Edge Vortex Stability in a Flapping Model Hummingbird Wing," AIAA Paper 2008-3718, 38th Fluid Dynamics Conference and Exhibit, Jun. 23-26, 2008, Seattle, Washington, 23 pgs.
Lake, R. C. et al., "Experimental and Analytical Investigation of Dynamic Characteristics of Extension-Twist-Coupled Composite Tubular Spars," NASA TP 3225, ARL Technical Report 30, Feb. 1993, 60 pgs.
Brown, W., "Microwave Energy Transmission," Third Princeton/AIAA Conference on Space Manufacturing Facilities, Princeton, N. J., May 9-12, 1977, 9 pgs.
Nixon, M., "Extension-Twist Coupling of Composite Circular Tubes with Application to Tilt Rotor Blade Design," AIAA Paper 87-0772, Structures, Structural Dynamics and Materials Conference, 28th, Monterey, CA, Apr. 6-8, 1987, pp. 295-303.
Alden, A. et al., "Some Recent Developments in Wireless Power Transmission to Micro Air Vehicles," AIP Conference Proceedings, 2005, vol. 766, pp. 303-307.
Hodges, D. H., "Torsion of Pretwisted Beams Due to Axial Loading," ASME Journal of Applied Mechanics, vol. 47, 1980, pp. 393-397.
"Global Parcel Delivery Market Insight Report 2015—Combined Revenues of Carriers Covered in this Report Amounts to US$150 Billion," Research and Markets, Nov. 27, 2015, 2 pgs.
Brindejonc, A., "Design and Testing of an Autorotative Payload Delivery System: The Autobody," Thesis submitted to the Faulty of the Graduate School of the University of Maryland, 2005, 158 pgs.
Hubel, T. Y., "The importance of leading edge vortices under simplified flapping flight conditions at the size scale of birds," The Journal of Experimental Biology, vol. 213, 2010, pp. 1930-1939.
Leishman, J., "Principles of Helicopter Aerodynamics," Cambridge University Press 2006, Chapter 12/Autogiros and Gyroplanes, pp. 706-709.
Lentink, D. et al., "Leading-Edge Vortices Elevate Lift of Autorotating Plant Seeds," Science, vol. 324, Jun. 12, 2009, pp. 1438-1440.
Nampy, S. N. et al.., "Extension-Twist Coupled Tiltrotor Blades Using Flexible Matrix Composites," 46th AIAA/ASME/ASCE/AHS/ASC Structures, Structural Dynamics and Materials Conference, Apr. 18-21, 2005, pp. 1-19.
Nampy, S. N. et al., "Thermomechanical Behavior and Experimental Testing of Flexible Matrix Composite Box-Beams with Extension-Twist Coupling," 47th AIAA/ASME/ASCE/AHS/ASC Structures, Structural Dynamics, and Materials Conference, May 1-4, 2005, pp. 1-15.
Ozbay, S. et al., "Optimum stacking sequences for extension-twist coupled composites subject to thermal stresses," Adv. Composite Mater., vol. 15, No. 2, pp. 127-137.
Prouty, R., "Helicopter Aerodynamics," Chapter 92—A New Look at the Autogyro, 2007, p. 495.
Wikipedia , "AutoGyro Calidus," https://en.wikipedia.org/wiki/AutoGyro_Calidus> retrieved Apr. 3, 2019, 3 pgs.

UPDRAFT ASSISTED ROTORCRAFT TAKE-OFF

FIELD OF THE DISCLOSURE

The present disclosure is generally related to rotorcraft.

BACKGROUND

A rotorcraft is an aircraft that flies due to a lifting force generated by a rotor. During operation, the rotor displaces air to generate a downdraft in a direction opposite to the lifting force. During take-off, the rotorcraft spins up its rotor to a take-off speed while rotor blades are set to a low angle of attack (to reduce lift). After the rotor is rotating at the take-off speed, the rotor blades are adjusted to a higher angle of attack to increase lift, which also increases the downdraft.

SUMMARY

In a particular implementation, a rotorcraft includes a frame and an engine coupled to the frame. The rotorcraft also includes a rotor hub coupled to the engine. The rotorcraft further includes a plurality of rotor blades coupled to the rotor hub, each rotor blade configured to be adjusted to a negative pitch angle such that each rotor blade is oriented at a negative angle of attack. The rotation of the plurality of rotor blades at the negative pitch angle generates an updraft that, during a subsequent vertical take-off operation, applies an upward force to the rotorcraft to supplement lift generated by the plurality of rotor blades.

In another particular implementation, a system includes a rotorcraft and a ground-based station. The rotor craft includes a frame and an engine coupled to the frame. The rotorcraft also includes a rotor hub coupled to the engine and a plurality of rotor blades coupled to the rotor hub. Each rotor blade is configured to be adjusted to a negative pitch angle such that each rotor blade is oriented at a negative angle of attack. The rotation of the plurality of rotor blades at the negative pitch angle generates an updraft that, during a subsequent vertical take-off operation, applies an upward force to the rotorcraft to supplement lift generated by the plurality of rotor blades. The ground-based station is configured to supply energy used to rotate the plurality of blades prior to initiation of the vertical take-off operation.

In another particular implementation, a method of performing a vertical take-off operation of a rotorcraft includes adjusting a plurality of rotor blades of a rotor to a negative pitch angle such that the plurality of rotor blades are oriented at a negative angle of attack. The method also includes rotating the rotor and plurality of rotor blades at a take-off speed at the negative angle of attack. The method includes generating, by rotation of the plurality of rotor blades at the negative angle of attack, an updraft that exerts an upward force on the rotorcraft and persists for some time after adjusting the rotor blades to a neutral or positive angle of attack. The method also includes, after generating the updraft, adjusting the plurality of rotor blades to a positive pitch angle such that the plurality of rotor blades are oriented at a positive angle of attack to generate lift. The method further includes vertically taking-off, by the rotorcraft, using the lift provided by the plurality of rotors and using the upward force of the updraft.

Because the rotorcraft rotates the rotor blades at a negative angle of attack and generates an updraft, and because the updraft persists for some time (e.g., for several seconds) after the rotor blades stop generating the updraft, the rotorcraft is assisted by the updraft on take-off, i.e., the updraft helps force (push) the rotorcraft upwards. Accordingly, the rotorcraft uses less power and energy during take-off. Additionally, the rotorcraft can take-off at higher altitudes, higher temperatures, and/or with a higher take-off weight. Furthermore, the rotorcraft can be powered by a ground-based station while generating the updraft to conserve on-board energy (e.g., fuel or electric charge). The features, functions, and advantages described can be achieved independently in various examples or may be combined in yet other examples, further details of which can be found with reference to the following description and drawings.

DETAILED DESCRIPTION

Implementations described herein are directed to a system and method for operating a rotorcraft configured to generate an updraft. The rotorcraft is configured to, before taking off, adjust rotor blades thereof to a negative pitch angle such that the rotor blades are oriented at a negative angle of attack. Rotation of the rotor blades at the negative angle of attack produces an updraft, as opposed to a downdraft. The updraft provides an upward force on a portion of (e.g., a body or a frame of) the rotorcraft that persists for some time after the rotor blades are moved to a positive angle of attack during a vertical take-off operation. While the updraft persists, it provides a drag force on the body of the rotorcraft in an upward direction, which assists the rotorcraft during the vertical take-off, e.g., the upward force of the updraft supplements a lifting force generated by the rotor blades. Some conventional helicopters can adjust their rotor blades to a pitch angle such that the rotor blade are oriented at slightly positive angle of attack to reduce downdraft on take-off. In contrast, the rotorcraft described herein is configured to adjust its rotor blades over a larger range of angles of attack. Additionally, the rotorcraft described herein can also have rotor blades with less asymmetric top and bottom surfaces, as compared to conventional rotorcraft, to accommodate the negative angle of attack settings.

In some implementations, the rotorcraft is configured to be powered by a ground-based station during or before a vertical take-off. As an illustrative example, a pre-rotator device of the ground-based station rotates the rotor of the rotorcraft to a take-off speed, referred to as spinning-up the rotor. As the rotor is being spun-up, the rotor blades are set at a negative pitch angle and negative angle of attack. Spinning up the rotor stores energy (e.g., as kinetic energy) in the rotor and rotating the rotor blades at the negative angle of attack generates an updraft (as opposed to a downdraft). After the rotor is spun-up and the updraft is generated, the rotor blades are set at a positive pitch angle and positive angle of attack to generate lift. The rotorcraft is detached from the ground based station and vertically ascends using the lift generated by the rotor blades (at least some of which is derived from the kinetic energy stored in the rotor) and the updraft. By storing energy in the rotor (also referred to as "pre-rotating" the rotor) and generating the updraft using energy from the ground-based station, energy resources of the rotorcraft are conserved, enabling the rotorcraft to operate more efficiently than rotorcraft that take-off using only onboard energy resources.

Figure 1:
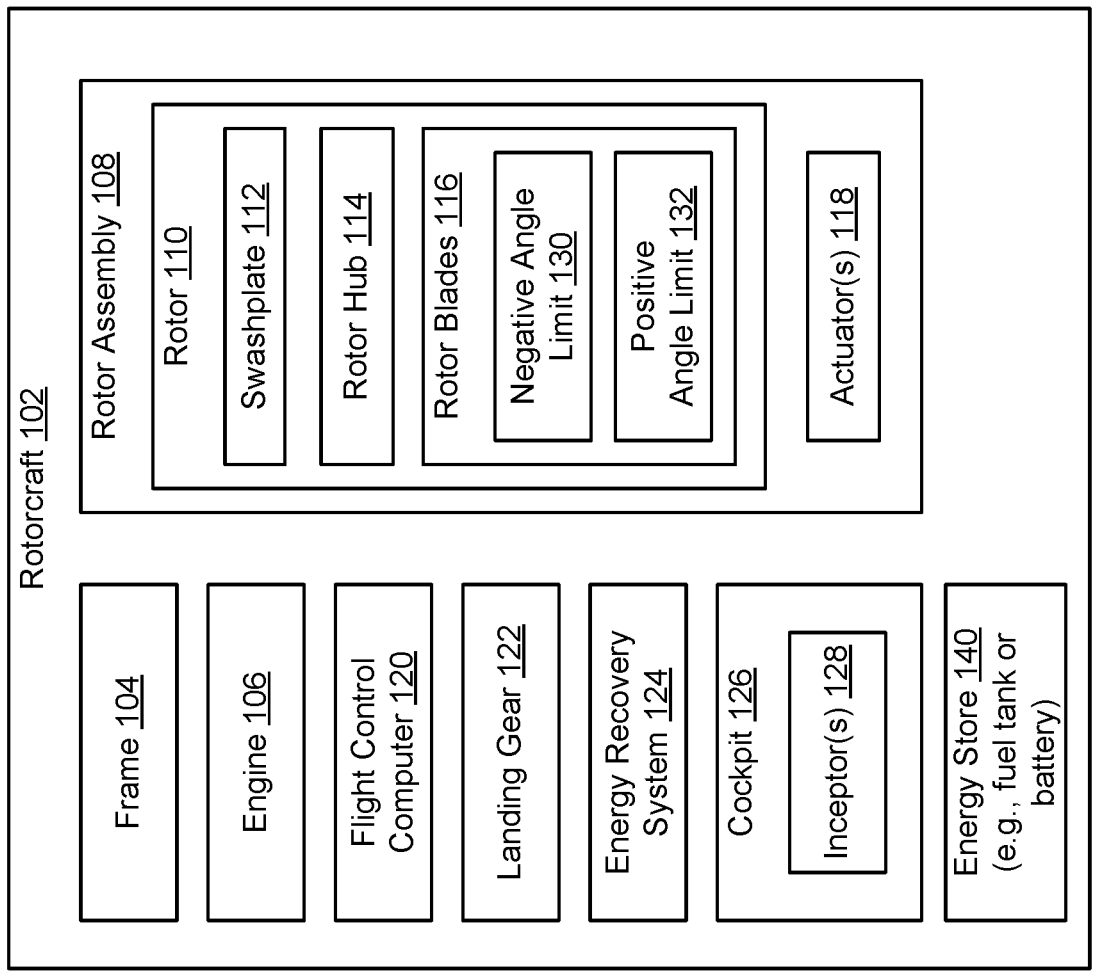
FIG. 1 is a block diagram that illustrates a rotorcraft configured to generate an updraft.
Figure 2:
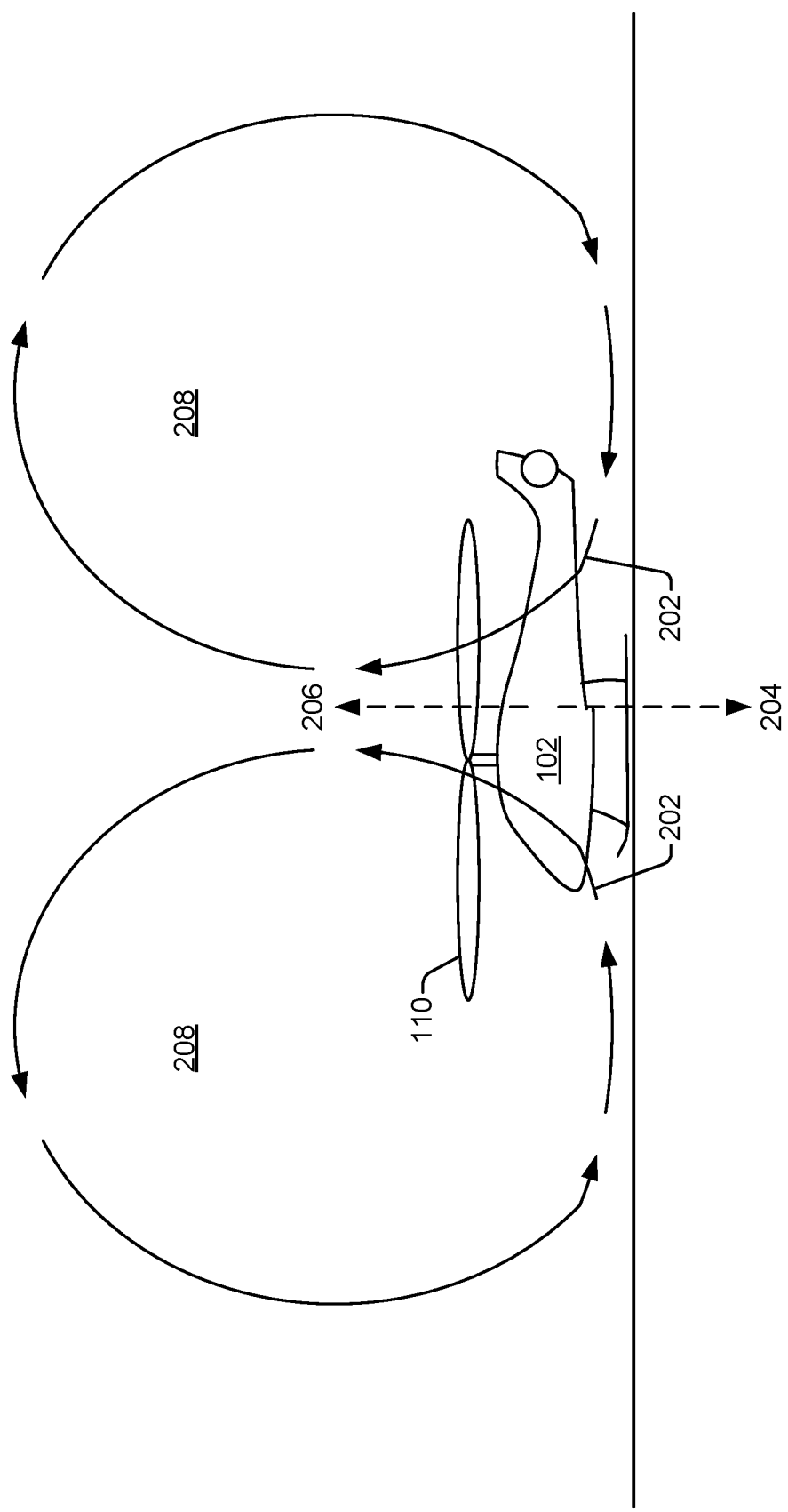
FIG. 2 is a diagram that illustrates an example of an updraft generated by the rotorcraft of FIG. 1.

FIG. 1 illustrates a block diagram of an example of a rotorcraft 102. The rotorcraft 102 is configured to generate an updraft that applies an upward force to the rotorcraft 102 to supplement lift generated by rotor blades 116 of the rotorcraft 102 during a vertical take-off operation. FIG. 2, discussed further below, illustrates an example of an updraft 202. The rotorcraft 102 may include or correspond to a helicopter, multi-copter (e.g., a quadcopter), or a tiltrotor aircraft. Additionally, rotorcraft 102 can be an unmanned vehicle (e.g., an autonomous or remotely piloted vehicle) or a manned vehicle. In FIG. 1, the rotorcraft 102 includes a cockpit 126 with one or more control inceptors 128 (e.g., a collective inceptor, a cyclic inceptor, etc.); however, if the rotorcraft 102 is an unmanned vehicle, the cockpit 126 can be omitted or replaced by a passenger compartment that does not include the inceptors 128.

The lift generated by a rotor spinning at a particular speed can be increased by increasing the pitch of the rotor blades, as described with reference to FIG. 3. Generally, each rotor blade of a rotorcraft is shaped such that the pitch changes along the length of the rotor blade. For example, in a particular configuration, a tip of the rotor blade may be at a larger pitch angle than a root of the rotor blade. Accordingly, rather than a single pitch of the rotor blade, the rotor blade can have a pitch distribution that corresponds to the set of pitch angles of the rotor blade along the length of the rotor blade. In the description that follows, a single pitch angle is referenced for each rotor blade. This single pitch angle is the actual pitch angle of the rotor blade if the rotor blade has only one pitch angle. However, if the rotor blade is shaped to have a pitch distribution, the single pitch angle can be an average pitch angle of the rotor blade or a pitch angle at a particular position along the rotor blade (e.g., a midpoint). As used herein, a negative pitch angle refers to pitch angle of the rotor blades that generates, at the rotor blades, a net upward airflow (i.e., an updraft) due to motion of the rotor. When the rotorcraft generates a net upward airflow, the rotorcraft also experiences "negative lift", which refers to a force exerted by the spinning rotor in the same direction (or having a component in the same direction) as gravity. Conversely, a positive pitch angle refers to a pitch angle of the rotor blades that generates, at the rotor blades, a net downward airflow (i.e., a downdraft) due to motion of the rotor. When the rotorcraft generates a net downward airflow, the rotorcraft also experiences "positive lift" or "lift", which refers to a force exerted by the spinning rotor in a direction (or having a component in the direction) opposite gravity.

In FIG. 1, the rotorcraft 102 includes a frame 104, a rotor assembly 108, an engine 106, and landing gear 122. The frame 104 is configured to support components of the rotorcraft 102. The frame 104 can include or correspond to a fuselage or a body of the rotorcraft 102.

The rotor assembly 108 is coupled to the frame 104 and to the engine 106. The rotor assembly 108 includes components configured to generate lift and, in some implementations, to steer the rotorcraft. In FIG. 1, the rotor assembly 108 includes a rotor 110. The rotor 110 includes a swashplate 112, a rotor hub 114, and rotor blades 116. The rotor assembly 108 also includes one or more actuators 118 that control the position (e.g., pitch angles) of the rotor blades 116. The actuators 118 can include collective actuators that change the pitch angle of all of the rotor blades 116 collectively (e.g., to increase or decrease lift), cyclic actuators that change the pitch angle of particular rotor blades 116 (e.g., for lateral steering), or both. The pitch of each of the rotor blades 116 is adjustable within a range of angles from a negative angle limit 130 to a positive angle limit 132. The negative angle limit 130 is such that the rotor blades 116 can be positioned at a negative pitch angle before take-off, as described further below. The positive angle limit 132 is set to provide sufficient lift while avoiding stall conditions. In some implementations, because of the shape of the rotor blades 116, a magnitude of the lift generated when the rotor blades 116 are at a particular positive angle of attack (e.g., 15 degrees) is greater than a magnitude of the negative lift generated by the rotor blades 116 when the rotor blades 116 are at an equivalent negative angle of attack (e.g., −15 degrees). For example, a bottom surface of the rotor blades 116 is flatter or straighter as compared to an upper surface of the rotor blades 116 and produces less lift potential.

During flight, rotation of the rotor 110 is powered by the engine 106. In some implementations, the rotorcraft 102 is configured to couple to a ground-based station (such as the ground-based station 402 of FIG. 4) before take-off, and the rotation of the rotor 110 before take-off (also referred to as "pre-rotation") is powered by the ground-based station, as described further with reference to FIG. 4. During take-off, the rotation of the rotor 110 is powered by the engine 106, by a pre-rotation device, or by both the engine 106 and the pre-rotation device, as described further with reference to FIG. 4. The engine 106 can include an electric motor, an internal combustion engine, or both (e.g., a hybrid system). The rotorcraft 102 also includes an energy store 140 which stores energy used by the rotorcraft 102 during flight. The energy store 140 can store electromagnetic energy. For example, the energy store 140 can include a super-capacitor that stores energy in an electric field. Additionally, or in the alternative, the energy store 140 can store kinetic energy. For example, the energy store 140 can include a flywheel. Alternatively, or in addition, the energy store 140 can store chemical energy. For example, when the engine 106 is an electric motor, the energy store 140 can include a battery that stores energy based on electrochemical potentials. In another example, when the engine 106 is an internal combustion engine, energy store 140 can include a fuel tank that stores a fuel burned by the engine 106. In some implementations, the energy store 140 can include more than one type of energy storage device. For example, for a hybrid system, the energy store 140 can include a fuel tank to store fuel consumed by an internal combustion engine, and a battery that is charged by the internal combustion engine.

In FIG. 1, the rotorcraft 102 includes the landing gear 122 coupled to the frame 104. For example, the landing gear 122 can include or correspond to a set of wheels, skids, pads, legs, pontoons, or other apparatus configured to support the weight of the rotorcraft 102 when not in flight. In some implementations, the landing gear 122 is retractable. In some implementations, an energy recovery system 124 is coupled to the landing gear 122, the frame 104, or both. In some implementations, the energy recovery system 124 is configured to deform (e.g., compress or extend) responsive to the negative lift generated by the rotor 110 while spinning at the negative pitch angle. The deformation of the energy recovery system 124 stores energy that is available for use during the vertical take-off operation. For example, during the vertical take-off operation, the energy stored in the energy recovery system 124 is released to supplement the upward force applied to the rotorcraft 102 by the updraft. As a non-limiting example, the energy recovery system 124 can include a spring, piston and compressible fluid, another device configured to store and return energy due to the compression, or any combination thereof.

In FIG. 1, the rotorcraft 102 includes a flight control computer 120. The flight control computer 120 is configured to receive flight inputs (e.g., as a set of pre-flight instructions or waypoints, as remote pilot input, or via the inceptors 128) and to control the rotor assembly 108 to fly the rotorcraft 102 responsive to the flight inputs. For example, the rotorcraft 102 can be a "fly-by-wire" craft in which flight inputs are processed by the flight control computer 120 to generate commands to the actuators 118 based on control laws. In such implementations, the flight control computer 120 can control the pitch angle of the rotor blades 116 to facilitate take-off using the updraft generated by rotation of the rotor blades 116 at the negative pitch angle. In other implementations, the rotorcraft 102 is not a fly-by-wire craft, and the flight control computer 120 is configured to assist a pilot, e.g., to provide recommendations regarding the timing of take-off to gain the most benefit from the updraft. In yet other implementations, the flight control computer 120 can be omitted.

The rotorcraft 102 is configured to perform vertical take-off operations into an updraft generated by the rotorcraft 102. During operation, the rotor assembly 108 adjusts (e.g., tilts) the rotor blades 116 to a negative pitch angle (e.g., to the negative angle limit 130) such that the rotor blades 116 are oriented at a negative angle of attack. As an illustrative, non-limiting example the negative angle of attack is −12 to −15 degrees. The engine 106 drives the rotor 110 to rotate the rotor blades 116 at a first speed (e.g., a take-off speed) while the rotor blades 116 are oriented at the negative angle of attack. The rotor blades 116 generate negative lift and generate an updraft. In some implementations, a downward force of the negative lift compresses the energy recovery system 124 to store energy in the energy recovery system 124.

After generating the updraft, the rotor assembly 108 adjusts (e.g., tilts) the rotor blades 116 to a positive pitch angle such that the rotor blades 116 are oriented at a positive angle of attack. As an illustrative, non-limiting example, the positive angle of attack is 15 to 20 degrees. While rotating at the positive angle of attack, the rotor blades 116 generate lift. Additionally, the updraft that was established by spinning up the rotor blades 116 at the negative angle of attack also exerts an upward force on the rotorcraft 102, which assists the rotorcraft 102 with lifting off. Further, in implementations that include the energy recovery system 124, the energy recovery system 124 releases energy stored due to the negative lift to generate an additional upward directed force on the rotorcraft 102 to further assist the rotorcraft 102 with lifting off. The upward force on the rotorcraft provided by the updraft (and in some implementations, the energy recovery system 124) acts to offset a portion of the take-off weight of the rotorcraft 102, which can enable the rotorcraft 102 to operate with a higher actual take-off weight, to operate at higher altitude, to operate at higher temperature, to operate with increased range, to operate more efficiently, or any combination thereof.

FIG. 2 is a diagram that illustrates an example of an updraft 202 generated by the rotorcraft 102 of FIG. 1. As illustrated in the example of FIG. 2, the rotorcraft 102 is a helicopter, and the rotorcraft 102 generates the updraft 202. To illustrate, the rotor assembly 108 adjusts the rotor blades 116 to a negative pitch angle to orient the rotor blades 116 at the negative angle of attack, as described further with reference to FIG. 3. Rotation of the rotor blades 116 at the negative angle of attack generates negative lift 204. To generate the negative lift 204, the rotor blades 116 force air upwards. As the air is forced upwards, the air forms or is directed into the updraft 202 (e.g., a portion of a reverse vortex ring 208). This movement of air is referred to as the updraft 202, and the updraft 202 provides an upward force 206 on the rotorcraft 102. When the rotor blades 116 are oriented at a positive angle of attack during take-off, the upward force 206 of the updraft 202 increases lift generated by the rotor blades 116.

Figure 3:
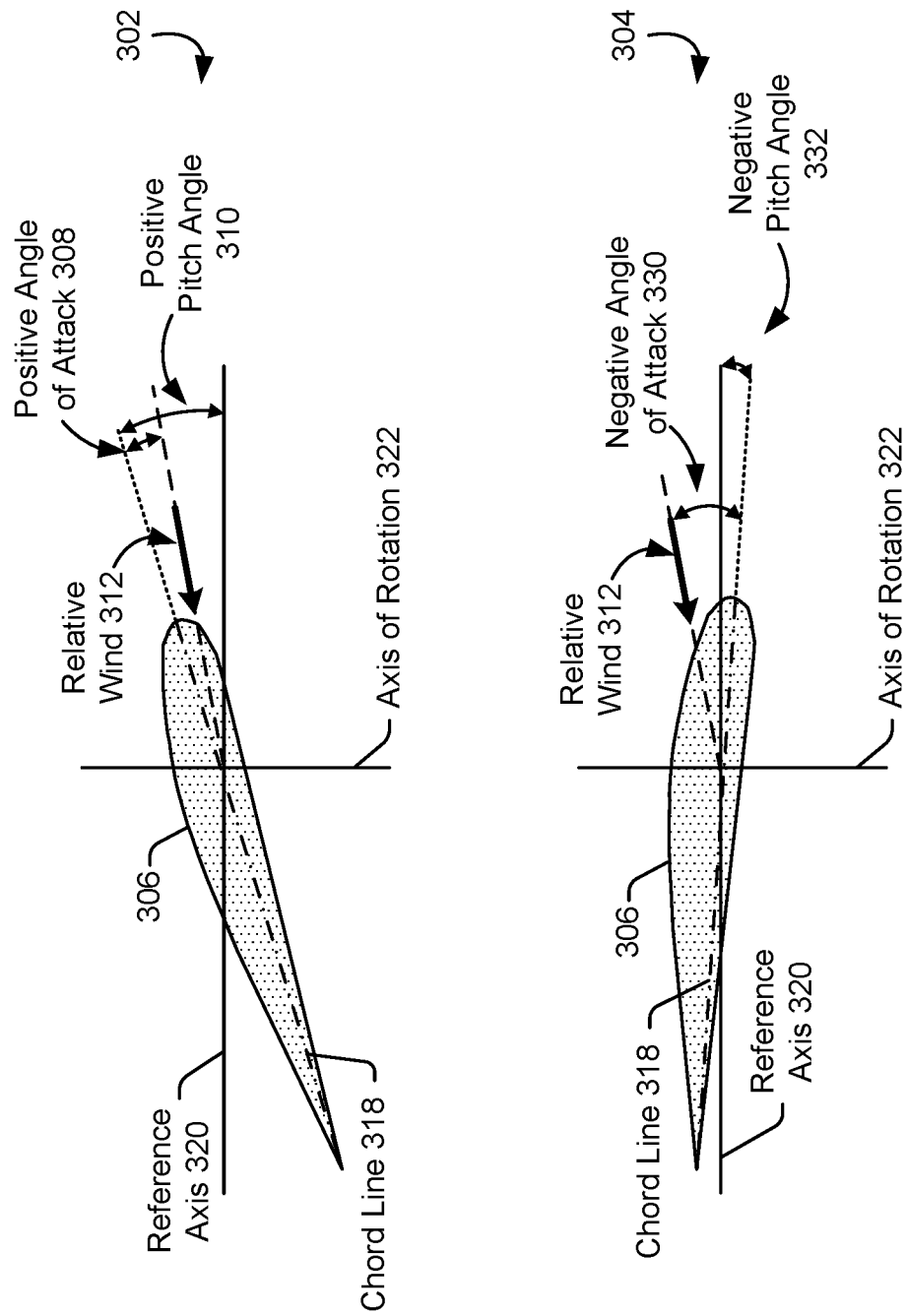
FIG. 3 is a diagram that illustrates representations of a profile view of a rotor blade of the rotorcraft of FIG. 1.

FIG. 3 illustrates two cross sectional views 302, 304 of a rotor blade 306 of the rotorcraft 102. The rotor blade 306 corresponds to any one of the rotor blades 116. The views 302, 304 also illustrate several reference axes, including a reference axis 320 and an axis of rotation 322. The axis of rotation 322 is illustrated as a vertical line and represents a center of the rotor hub 114 of FIG. 1 coupled to the rotor blade 306. The reference axis 320 is illustrated as a horizontal line and represents a plane in which the rotor blades 116 (including the rotor blade 306) rotate around the axis of rotation 322. The views 302, 304 also illustrate a chord line 318 of the rotor blade 306. The pitch angles and angles of attack described below are angles with respect to the chord line 318. For example, "pitch angle" refers to an angle between the chord line 318 and the reference axis 320, and "angle of attack" refers to an angle between the chord line 318 and a direction of relative wind 312.

The view 302 illustrates a positive pitch angle 310 and a positive angle of attack 308 of the rotor blade 306. The view 304 illustrates a negative pitch angle 332 and a negative angle of attack 330 of the rotor blade 306.

The pitch angle 310, 332 (also referred to as an angle of incidence) is a technical angle rather than an aerodynamic angle. The angle of attack 308, 330 is an aerodynamic angle, and the angle of attack 308, 330 can change with no change in the blade pitch angle 310, 332 (e.g., based on a change in the direction of the relative wind 312). The direction of the relative wind 312 is based on a speed and direction of the airflow near the rotor blade 306. In the absence of airflow (i.e., with no relative wind 312), the angle of attack 308, 330 and the blade pitch angle 310, 332 are equal. However, when a relative wind 312 is present and is not aligned with the reference axis 320, the angle of attack 308, 330 is different from the blade pitch angle 310, 332. Assuming no change in the relative wind 312, the angle of attack 308, 330 increases when the blade pitch angle 310, 332 is increased, and the angle of attack 308, 330 decreases when the blade pitch angle 310, 332 is reduced. A change in the angle of attack 308, 330 changes the coefficient of lift, thereby changing the lift produced by the rotor blade 306 and the resulting updraft 202 or downdraft.

The angle of attack 308, 330 can be different at different points along the length of the rotor blade 306 (e.g., from a root of the rotor blade 306 at the rotor hub 114 to a tip of the rotor blade 306). The angles of attack 308, 330 in FIG. 3 can be at the tip of the rotor blade 306, at the root of the rotor blade 306, or at any point in between the tip and the root (e.g., at 0.75 chord length). Additionally, the angle of attack 308, 330 of the rotor blade 306 can be different at different points along a rotational path of the rotor blade 306 around the axis of rotation 322. The angles of attack 308, 330 in FIG. 3 can be at any representative point along the rotational path of the rotor blade 306.

Figure 4:
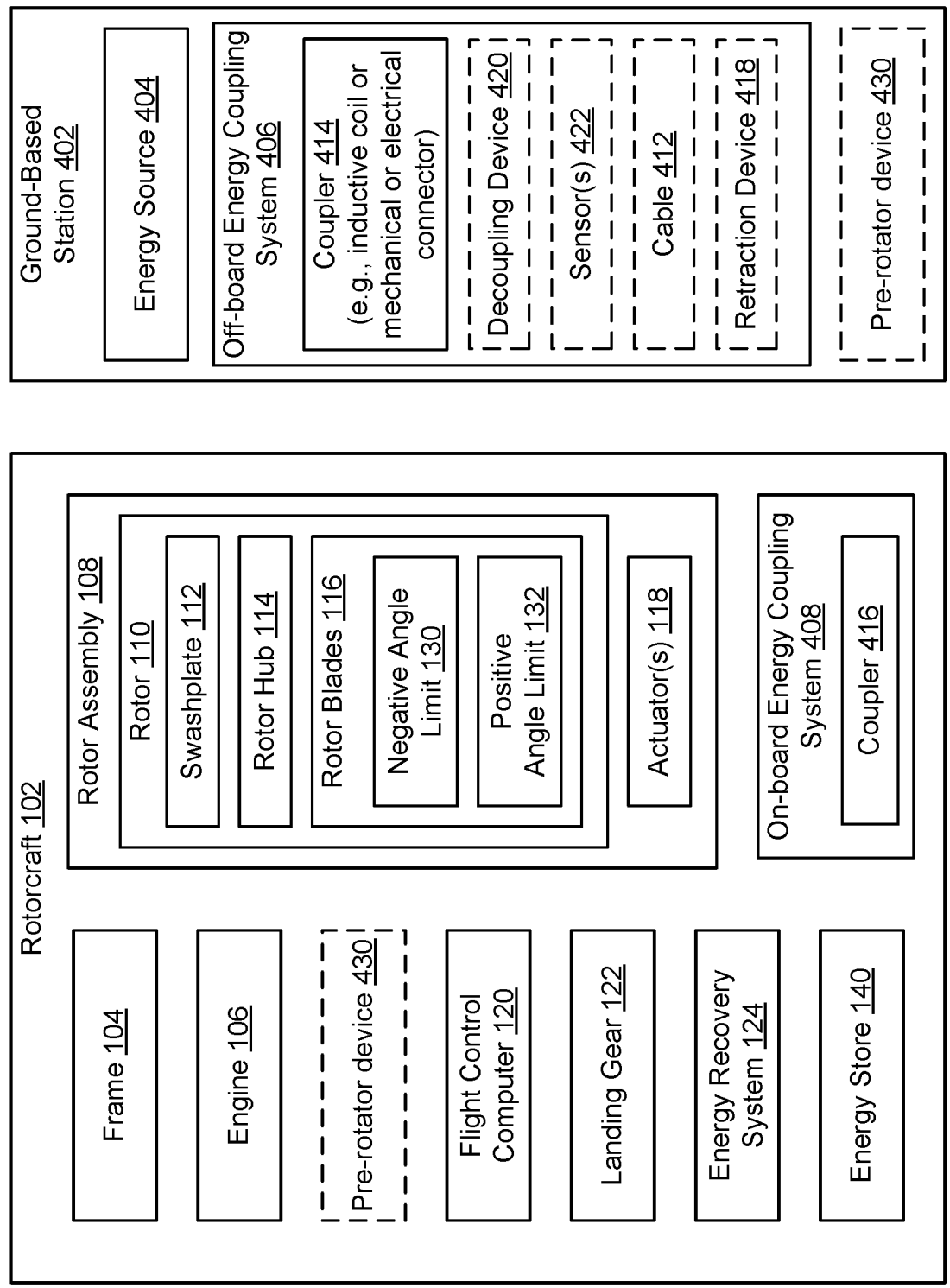
FIG. 4 is a block diagram that illustrates an example of a system including the rotorcraft of FIG. 1 and a ground-based station.

FIG. 4 is a block diagram that illustrates an example of a system 400 that includes the rotorcraft 102 of FIG. 1 and a ground-based station 402. The rotorcraft 102 of FIG. 4 is identical to the rotorcraft 102 of FIG. 1 except for the addition of several components to facilitate interaction with the ground-based station 402.

The ground-based station 402 includes an energy source 404 and an off-board energy coupling system 406. In FIG. 4, the rotorcraft 102 includes an on-board energy coupling system 408 that is configured to engage the off-board energy coupling system 406 in order to receive energy from the energy source 404 of the ground-based station 402. For example, the off-board energy coupling system 406 includes a coupler 414 configured to engage a corresponding coupler 416 of the on-board energy coupling system 408.

In a particular implementation, the coupler 414 is configured to provide energy to the coupler 416 via electrical signals. For example, the coupler 414 can include a coil, also referred to herein as an inductive coil or an inductor. In this example, the coupler 416 also includes a coil, and the coils interact electromagnetically (e.g., via inductive coupling) to supply energy from the energy source 404 to the rotorcraft 102. In another example, the coupler 414 is an electrical connector (e.g., a plug) of a cable 412, and the coupler 416 is a corresponding electrical connector (e.g., a receptacle). In this example, the energy from the energy source 404 flows through the cable 412 and the coupler 414 to the coupler 416. Inductive coupling is a less energy efficient method of energy transfer than using the cable 412 and electrical connectors. However, when the cable 412 is used, care should be taken to decouple the cable 412 from the rotorcraft before, during, or shortly after take-off. In some implementations, when the cable 412 is used, the off-board energy coupling system 406 includes a decoupling device 420 to automatically and reliably disconnect the coupler 414 from the coupler 416 before, during, or shortly after take-off of the rotorcraft 102.

In a particular implementation, the decoupling device 420 is passive, such as a plug that is readily pulled from a receptacle (of the coupler 416) by tension in the cable 412 due to lift-off of the rotorcraft 102. In another implementation, the decoupling device 420 is coupled to one or more sensors 422 and disconnection from the coupler 416 is commanded based on sensor data from the sensor(s) 422. As an example, the sensor(s) 422 can be configured to generate sensor data indicating blade pitch angle of the rotor blades 116. In this example, the decoupling device 420 can be configured to disconnect the connector of the cable 412 from the coupler 416 responsive to the sensor data indicating that the blade pitch angle of the rotor blades 116 is increasing. To illustrate, the rotor blades 116 are spun up at a negative pitch angle before take-off, and adjusted to a positive pitch angle for take-off. In this illustrative example, the sensor(s) 422 can detect when the pitch angle of the rotor blades 116 changes toward the positive pitch angle, and the decoupling device 420 can cause the couplers 414, 416 to disconnect based on the sensor data indicating that the pitch angle of the rotor blades 116 has changed toward the positive pitch angle. The cable 412 can be coupled to a retraction device 418 to automatically retract the cable 412 responsive to the sensor data, responsive to the decoupling device 420 indicating that the couplers 414, 416 are disconnected, or responsive to detecting disconnection of the couplers 414, 416.

In another particular implementation, the coupler 414 is configured to provide energy to the coupler 416 mechanically. For example, the coupler 414 can include a mechanical coupler (e.g., a drive head of a rotary shaft), and the coupler 416 also includes a mechanical coupler (e.g., receptacle for the drive head). In this example, the off-board energy coupling system 406 supplies energy to the rotorcraft 102 in the form of rotary motion. For example, the off-board energy coupling system 406 can include a pre-rotator device 430 that is configured to rotate a rotary shaft. Before the rotorcraft 102 takes off, the rotary shaft can be coupled to the coupler 416 via the coupler 414. The pre-rotator device 430 can rotate the rotary shaft to spin up the rotor blades 116 to generate the updraft. When the rotorcraft 102 lifts off, the rotary shaft can be automatically disengaged from the coupler 416 or the decoupling device 420 can disconnect the rotary shaft from the coupler 416.

In some implementations, the pre-rotator device 430 can be part of the rotorcraft 102 rather than part of the ground-based station 402. For example, the pre-rotator device 430 can be coupled to the rotor hub 114. In such implementations, the on-board energy coupling system 408 can be coupled to the pre-rotator device 430 to supply energy to the pre-rotator device 430 from the energy source 404 of the ground-based station 402. In some such implementations, the pre-rotator device 430 is not coupled to the energy store 140 of the rotorcraft 102 so that only energy from the ground-based station 402 is used to spin up the rotor 110. In other implementations, the pre-rotator device 430 can be selectively decoupled from the energy store 140 of the rotorcraft 102 so that when the rotorcraft 102 is coupled to the ground-based station 402, the pre-rotator device 430 can spin up the rotor 110 using only energy from the ground-based station 402. In yet other implementations, the pre-rotator device 430 can spin up the rotor 110 using energy from the ground-based station 402 and energy from the energy store 140 of the rotorcraft 102. In implementations in which at least some of the energy used to spin up the rotor 110 is provided by the ground-based station 402, the take-off efficiency of the rotorcraft 102 is improved because energy reserves of the energy store 140 are not used for take-off, or fewer of the energy reserves of the energy store 140 are used for take-off than if no energy were provided by the ground-based station 402.

The ground-based station 402 can be used alone or in combination with other take-off assistance mechanisms described with reference to FIG. 1. For example, prior to take-off, the rotor blades 116 can be oriented at a negative angle of attack and rotated using energy from the energy source 404 of the ground-based station 402. The rotation of the rotor blades 116 at the negative angle of attack generates the updraft 202 that applies the upward force 206 to the rotorcraft 102 to supplement lift generated by the plurality of rotor blades 116 during a vertical take-off operation. Additionally, the rotation of the rotor blades 116 at the negative angle of attack generates the downward force that compresses the energy recovery system 124 to store energy. During take-off, the rotor blades 116 are oriented at a positive angle of attack to generate lift. Take-off is assisted by energy from the ground-based station 402, that is stored in the rotor 110 by spinning the rotor 110 up to take-off speed, by upward force on the rotorcraft 102 due to the updraft 202, and by an upward force generated by the energy recovery system 124 releasing stored energy.

Together, the assisted take-off mechanisms described above can significantly improve the capabilities of the rotorcraft 102. For example, the energy used to generate the updraft 202, the energy stored in the energy recovery system 124, and the energy stored in the rotor 110 can all be generated using energy from the ground-based station 402. Accordingly, energy reserves of the energy store 140 are retained, and these energy reserves can be used to increase the flight time or range of the rotorcraft 102. The forces exerted by the updraft 202 and the energy recovery system 124 effectively reduce (e.g., offset a portion of) the take-off weight of the rotorcraft 102, which may enable the rotorcraft 102 to take-off with more payload, with more fuel, at a higher altitude, or at a higher temperature than the rotorcraft 102 would be able to if the take-off weight were not reduced.

Figure 5:
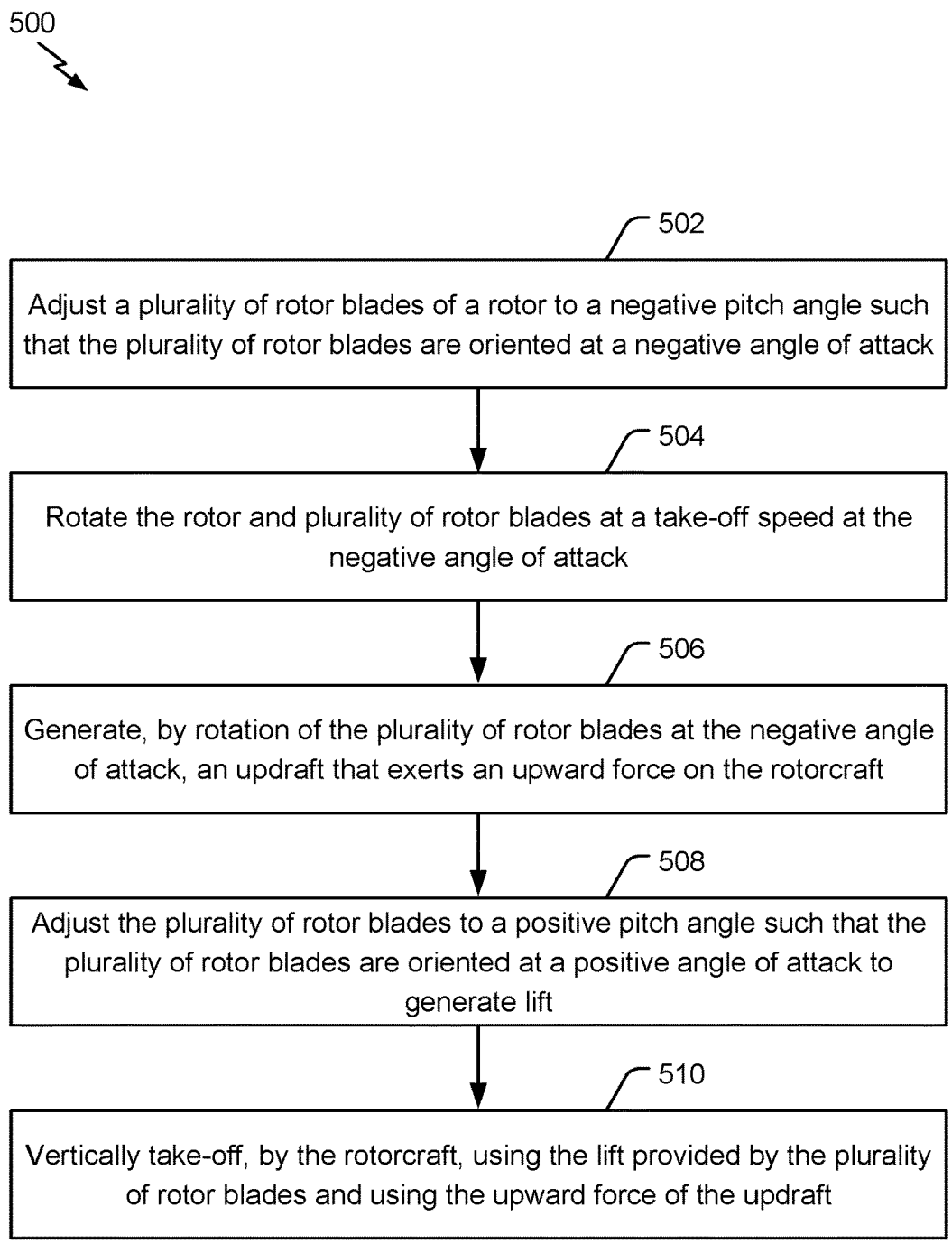
FIG. 5 is a flow chart of an example of a method of performing a vertical take-off operation of a rotorcraft.

FIG. 5 is a flow chart of an example of a method 500 of performing a vertical take-off operation of the rotorcraft 102 of FIGS. 1, 2 and 4. In a particular implementation, the method 500 can be initiated, controlled, or performed responsive to a processor, such as a processor of the flight control computer 120.

The method 500 includes, at 502, adjusting a plurality of rotor blades of a rotor to a negative pitch angle such that the plurality of rotor blades are oriented at a negative angle of attack. For example, the actuators 118 of the rotor assembly 108 can move the rotor blades 116 to the negative pitch angle 332 responsive to an input received via one of the inceptors 128 or responsive to a command from the flight control computer 120. In a particular implementation, the method 500 includes adjusting a swashplate of the rotor in response to a control input. Adjusting the swashplate changes a pitch angle of the plurality of rotor blades. For example, the actuators 118 can be coupled to the swashplate 112 and the actuators 118 can adjust the angle of the rotor blades 116 by moving or adjusting the swashplate 112.

The method 500 also includes, at 504, rotating the rotor and plurality of rotor blades at a take-off speed at the negative angle of attack. For example, the rotor 110 can be rotated by the engine 106, by the pre-rotator device 430, or both cooperatively. In some implementations, at least a portion of the energy used to rotate the rotor 110 is received from the ground-based station 402. To illustrate, at least a portion of the energy used to rotate the plurality of rotor blades 116 can be received at an electric motor (e.g., the engine 106 or the pre-rotator device 430) of the rotorcraft 102 from a ground-based energy source (e.g., the energy source 404 of the ground-based station 402).

The method 500 also includes, at 506, generating, by rotation of the plurality of rotor blades at the negative angle of attack, an updraft that exerts an upward force on the rotorcraft. For example, the updraft 202 generates the upward force 206 on the rotorcraft 102.

The method 500 also includes, at 508, after generating the updraft and while the updraft still persists, adjusting the plurality of rotor blades to a positive pitch angle such that the plurality of rotor blades are oriented at a positive angle of attack to generate lift. For example, the actuators 118 of the rotor assembly 108 can move the rotor blades 116 to the positive pitch angle 310 responsive to an input received via one of the inceptors 128 or responsive to a command from the flight control computer 120. Rotating the rotor blades 116 with a positive angle of attack 308 generates lift, as explained with reference to FIG. 3.

The method 500 also includes, at 510, vertically taking-off, by the rotorcraft, using the lift provided by the plurality of rotors and using the upward force of the updraft. In some implementations, the rotorcraft 102 includes an energy recovery system 124, and the method 500 includes storing energy in the energy recovery system 124 during rotation of the plurality of rotor blades at the negative angle of attack and releasing the energy stored in the energy recovery system to supplement the lift and the upward force during take-off.

The method 500 improves performance of the rotorcraft 102 by supplementing lift generated by the rotor blades during take-off with the upward force of the updraft. The lift can be further supplemented, in some implementations, by an upward force generated by releasing energy stored in an energy recovery system 124. In implementations in which the rotor 110 is pre-rotated using energy from the ground-based station 402, the performance of the rotorcraft 102 is even further improved. For example, in such implementations, the energy reserves onboard the rotorcraft 102 (e.g., in the energy store 140) are preserved and can be used to increase the flight time or range of the rotorcraft 102. Additionally, the forces exerted by the updraft 202, the energy recovery system 124, or both, offset a portion of the take-off weight of the rotorcraft 102, which enables the rotorcraft 102 to take-off with more payload, with more fuel, at a higher altitude, or at a higher temperature than the rotorcraft 102 would be able to if the portion of the take-off weight were not offset.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A rotorcraft comprising:
a frame;
an engine coupled to the frame;
a rotor hub coupled to the engine; and
a plurality of rotor blades coupled to the rotor hub, each rotor blade configured to be adjusted to a negative pitch angle prior to a vertical take-off operation such that each blade is oriented at a negative angle of attack, wherein rotation of the plurality of rotor blades at the negative pitch angle generates an updraft that persists for a time and that, during the vertical take-off operation, applies an upward force to the rotorcraft to supplement lift generated by the plurality of rotor blades after each of the rotor blades is adjusted from the negative pitch angle to a positive pitch angle for the vertical take-off operation.

2. The rotorcraft of claim 1, wherein the rotor hub is coupled to a swashplate configured to change a pitch angle of the plurality of rotor blades, and wherein the rotation of the plurality of rotor blades at the negative pitch angle further generates negative lift which exerts a downward force on the frame.

3. The rotorcraft of claim 2, further comprising:
landing gear; and
an energy recovery system coupled to the landing gear, wherein the energy recovery system is configured to compress in response to the negative lift, and wherein compression of the energy recovery system stores energy that is released during the vertical take-off operation to supplement the upward force applied to the rotorcraft by the updraft.

4. The rotorcraft of claim 1, wherein the engine comprises an internal combustion engine.

5. The rotorcraft of claim 4, wherein the rotor hub is configured to be coupled to a pre-rotator device of a ground-based station and is configured to be rotated by the pre-rotator device to generate the updraft.

6. The rotorcraft of claim 1, wherein the engine comprises an electric motor, and wherein the rotorcraft is configured to be powered by a ground-based station prior to the vertical take-off operation.

7. The rotorcraft of claim 1, further comprising an on-board energy coupling system configured to couple to an energy source of a ground-based station via an off-board energy coupling system, and wherein the rotorcraft is configured to rotate the plurality of rotor blades using energy from the energy source to generate the updraft.

8. The rotorcraft of claim 7, wherein the off-board energy coupling system includes a cable and a coupler and the on-board energy coupling system includes a corresponding coupler configured to couple to the coupler of the off-board energy coupling system.

9. The rotorcraft of claim 7, wherein the off-board energy coupling system includes a coupler configured to electromagnetically couple to an inductive coil of a coupler of the on-board energy coupling system.

10. The rotorcraft of claim 7, wherein the off-board energy coupling system includes a coupler configured to mechanically couple to a coupler of the on-board energy coupling system.

11. The rotorcraft of claim 7, further comprising a pre-rotator device coupled to the rotor hub and to the on-board energy coupling system, the pre-rotator device configured to rotate the plurality of rotor blades using the energy from the energy source to generate the updraft prior to the vertical take-off operation.

12. A system comprising:
a rotorcraft comprising:
a frame;
an engine coupled to the frame;
a rotor hub coupled to the engine; and
a plurality of rotor blades coupled to the rotor hub, each rotor blade configured to be adjusted to a negative pitch angle prior to a vertical take-off operation such that each blade is oriented at a negative angle of attack, wherein rotation of the plurality of rotor blades at the negative pitch angle generates an updraft that persists for a time and that, during the vertical take-off operation, applies an upward force to the rotorcraft to supplement lift generated by the plurality of rotor blades after each of the rotor blades is adjusted from the negative pitch angle to a positive pitch angle for the vertical take-off operation; and
a ground-based station configured to supply energy used to rotate the plurality of rotor blades prior to initiation of the vertical take-off operation.

13. The system of claim 12, wherein the engine includes an electric motor, and wherein the ground-based station comprises an energy source configured to be coupled to the engine to provide the energy.

14. The system of claim 13, further comprising:
a cable and a coupler configured to couple to a coupler of the rotorcraft to provide energy from the energy source to the electric motor;
a sensor configured to generate sensor data indicating blade pitch angle of the plurality of rotor blades; and
a decoupling device configured to disconnect the coupler of the cable from the coupler of the rotorcraft responsive to the sensor data indicating that the blade pitch angle of the plurality of rotor blades is increasing.

15. The system of claim 12, wherein the ground-based station comprises:
a pre-rotator device configured to rotate the rotor hub in combination with the engine; and
an energy source configured to provide the energy to the pre-rotator device.

16. A method of performing a vertical take-off operation of a rotorcraft, the method comprising:
adjusting a plurality of rotor blades of a rotor to a negative pitch angle such that the plurality of rotor blades are oriented at a negative angle of attack;
rotating the rotor and plurality of rotor blades at a take-off speed at the negative angle of attack;
generating, by rotation of the plurality of rotor blades at the negative angle of attack, an updraft that exerts an upward force on the rotorcraft;
after generating the updraft, adjusting the plurality of rotor blades to a positive pitch angle such that the plurality of rotor blades are oriented at a positive angle of attack to generate lift; and
vertically taking-off, by the rotorcraft, using the lift provided by the plurality of rotor blades and using the upward force of the updraft.

17. The method of claim 16, further comprising, adjusting a swashplate of the rotorcraft in response to a control input, wherein adjusting the swashplate changes a pitch angle of the plurality of rotor blades.

18. The method of claim 16, further comprising:
storing energy in an energy recovery system during rotation of the plurality of rotor blades at the negative angle of attack; and
during take-off, releasing the energy stored in the energy recovery system to supplement the lift and the upward force.

19. The method of claim 16, further comprising receiving energy to rotate the plurality of rotor blades, from a ground-based energy source, at an electric motor of the rotorcraft.

20. The method of claim 16, further comprising, while the rotorcraft is coupled to a ground-based station, initiating rotation of the rotor and the plurality of rotor blades by a pre-rotator device using energy from the ground-based station.

\* \* \* \* \*